United States Patent [19]

Betermier et al.

[11] 4,446,029

[45] May 1, 1984

[54] DESTRUCTION OF IRON CYANIDE COMPLEXES

[75] Inventors: Benedicte Betermier, Paris, France; Manuel Alvarez, East Brunswick; Robert D. Norris, Cranbury, both of N.J.

[73] Assignee: FMC Corporation, Philadelphia, Pa.

[21] Appl. No.: 421,601

[22] Filed: Sep. 22, 1982

[51] Int. Cl.$^3$ .......................... C02F 1/30; C02F 1/72
[52] U.S. Cl. ................................ 210/748; 210/759; 210/904
[58] Field of Search ............... 210/748, 752, 759, 904

[56] References Cited

U.S. PATENT DOCUMENTS

| | | | |
|---|---|---|---|
| 3,147,213 | 9/1964 | Byron et al. | 204/157.1 |
| 3,617,567 | 11/1971 | Mathre | 210/759 |
| 3,617,582 | 11/1971 | Lawes et al. | 210/904 |
| 3,649,493 | 3/1972 | Meiners et al. | 204/157.1 |
| 3,837,800 | 9/1974 | Wood | 210/748 |
| 3,843,516 | 10/1974 | Yamada et al. | 210/904 |
| 3,920,547 | 11/1975 | Garrison et al. | 210/904 |
| 3,926,803 | 12/1975 | Murchison | 210/904 |
| 4,012,321 | 3/1977 | Koubek | 210/759 |
| 4,045,316 | 8/1977 | Logan | 204/158 R |
| 4,220,529 | 9/1980 | Daude-Lagrave | 210/758 |

FOREIGN PATENT DOCUMENTS

| | | | |
|---|---|---|---|
| 47-9794 | 3/1972 | Japan | 210/904 |
| 54-15354 | 2/1979 | Japan | 210/904 |

OTHER PUBLICATIONS

Tomita et al., "The Use of Ultraviolet Radiation in the Treatment of Waste Fluids Containing Cyanmethemoglobin", Japanese Journal of Clinical Pathology 26, (10) 896 (1978).

Lawes et al., "A Peroxygen System for Destroying Cyanide in Zinc and Cadmium Electroplating Rinse Waters", Plating, Sep. 1973, p. 902.

Berglind et al., "Removal of Organic Matter from Water by UV and Hydrogen Peroxide", EPA-NATO Drinking Water Pilot Projects, FRE (1978).

Mill et al., "Free-Radical Oxidation of Organic Phosphonic Acid Salts in Water Using Hydrogen Peroxide, Oxygen, and Ultraviolet Light", Environmental Science and Technology, 13, (2), 205 (1979).

Barr, "An Evaluation of the Engineering Design Parameters of Hydrogen Peroxide, Ultraviolet Oxidation of Refractories in Waste Water", National Technical Information Service, AD-A045 351 (1976).

*Primary Examiner*—Peter A. Hruskoci
*Attorney, Agent, or Firm*—Richard E. Elden; Eugene G. Horsky

[57] ABSTRACT

A process for the destruction of cyanide in an aqueous solution containing an iron cyanide complex wherein the pH of the solution is adjusted to be between 11 and 12 and the solution is irradiated with ultraviolet radiation. The pH of the solution is subsequently reduced to between 8 and 11, hydrogen peroxide is added, and the solution is then reacted absent further radiation.

6 Claims, No Drawings

DESTRUCTION OF IRON CYANIDE COMPLEXES

This invention is concerned with the destruction of iron cyanide complexes in aqueous solutions.

Cyanides in the form of free cyanide salts or cyanide complexes are potentially toxic compounds which do not normally occur in domestic wastewater. Such cyanides are frequently found in industrial waste effluents. An example of commonly contaminated effluents can be found in steel and electroplating industries. It is essential that the total cyanide levels in these effluents be controlled; but adequate methods are not presently available, especially for ferricyanide complexes which are very stable and resist chemical means for their destruction.

Two commercial methods using hydrogen peroxide to destroy free cyanide ions in wastewater have been developed. One, known as the Kastone Process, is described in U.S. Pat. No. 3,617,582. In this process, cyanide ion is reacted with formaldehyde to produce glyconitrile. The latter is then oxidized by hydrogen peroxide in the presence of magnesium ion to produce hydroxyacetamide.

The second commercial process for the destruction of free cyanide ion in wastewater is described in U.S. Pat. No. 3,617,567. This patent teaches the oxidation of cyanide ion by hydrogen peroxide in the presence of a soluble catalyst, such as a salt of copper or iron at a pH of 8.3 to 11. Neither of these processes is effective in destroying the iron cyanide complexes, such as the ferricyanide ion or the ferrocyanide ion.

It is well known that hydrogen peroxide can be activated by ultraviolet (UV) light to form free hydroxyl radicals. These free radicals are very reactive and can attack otherwise refractory chemicals, such as chlorinated hydrocarbons. Koubek, in U.S. Pat. No. 4,012,321, teaches that waste organics in an aqueous solution can be destroyed by first adding hydrogen peroxide to the solution then exposing the solution to ultraviolet radiation with wavelength of less than 260 nanometers (nm). The work of Koubek was further extended by Barr, W. A., *An Evaluation of the Engineering Design Parameters of Hydrogen Peroxide, Ultraviolet Oxidation of Refractories in Waste Water,* U.S Naval Academy, Annapolis, Md., National Technical Information Service, AD-A045 351, August 1976. It was found that addition of the hydrogen peroxide before ultraviolet irradiation was important and that the system was satisfactory to oxidize refractory organic materials. The process was not demonstrated to be able to destroy cyanides in an iron cyanide complex.

Berglind et al, *Removal of Organic Matter From Water by UV and Hydrogen Peroxide,* EPA-NATO Drinking Water Pilot Project Report 11A, presented at the Advanced Treatment Technology Meeting in Karlsrue, West Germany in 1978, reviews the efficacy of hydrogen peroxide activated by ultraviolet light. Berglind et al observe that, in the prior art, hydrogen peroxide is added to the test water immediately before irradiation; they suggest that the overall effect may be improved by adding the hydrogen peroxide continuously or stepwise during the run. At no time do Berglind et al suggest that any of the irradiation could be effective in the absence of hydrogen peroxide.

According to the prior art, the destruction of ferricyanide in Van Kampen's Solution requires the application of severe chemical and physical conditions. Tomita et at, in "The Use of Ultraviolet Radiation in the Treatment of Waste Effluents Containing Cyanmethemoglobin," *Japanese Journal of Clinical Pathology,* 26, (10) 896 (1978), propose the use of a combination of ultraviolet irradiation, hydrogen peroxide, sparging with air, a pH of 12, and high-speed stirring. The process is not suitable for commercial use because of the high energy consumption and the high chemical cost; the process requires the use of 100 mols of hydrogen peroxide per mol of ferricyanide ion.

In the present process it has been found that aqueous solutions of iron cyanide complexes can be destroyed by first irradiating with ultraviolet light at a high pH followed by reaction with hydrogen peroxide in the absence of additional ultraviolet irradiation and at a reduced pH.

In one preferred embodiment of this invention, the initial solution containing an iron cyanide complex is adjusted within the range of pH 11 to pH 12 and the solution is then irradiated with actinic radiation of 200 nm to 335 nm, preferably such that at least 35 kilojoules (kJ) radiation is used; more preferably, at least 88 kJ of said radiation is used. One to five grams of hydrogen peroxide is then added to the solution per gram of the iron cyanide complex initally contained therein, preferably at least 2 grams of hydrogen peroxide should be added; and even more preferably, 4 grams of hydrogen peroxide should be added per gram of iron cyanide complex initially in the solution. The pH of the solution is then adjusted to be between 8 and 11 and the solution is allowed to react absent additional ultraviolet irradiation until substantially all of the free cyanide ion is destroyed.

In another preferred embodiment of this invention, the pH is adjusted as before within the range of pH 11 to pH 12, and irradiated with 200 nm to 335 nm actinic radiation, preferably 35 kJ of radiation. At least 1.1 grams of hydrogen peroxide is added to the solution per gram of iron cyanide complex initially contained therein and the irradiation is continued, preferably until at least 53 kJ additional radiation is supplied. Following this, at least 1 gram of additional hydrogen peroxide is added per gram of iron cyanide complex initially contained in the solution. Preferably, two grams of hydrogen peroxide per gram of iron cyanide complex is added. The pH of the solution is then adjusted within the range of 8 to 11 and the solution allowed to react absent any 200 nm to 335 nm actinic radiation until substantially all the free cyanide ion is destroyed.

The iron cyanide compounds are known to be very complicated; the iron can be present as either ferrocyanide or ferricyanide and the cyanide groups can be replaced with substituents, such as water, carbon monoxide, nitrous oxide, and nitric oxide. The exact mechanism of the process herein described is not known, nor is it necessary to know the mechanism in order to practice the invention. It is convenient to use the following possible mechanism as an aid to a general description of the process of the present invention: ultraviolet radiation, in the range of 200 nm to 335 nm causes hydroxyl ions or water molecules to replace the cyanide ions in an iron cyanide complex. The resulting complex is more susceptible to attack by hydrogen peroxide and is particularly susceptible to attack by the free hydroxyl radicals formed by hydrogen peroxide and ultraviolet. Furthermore, the stability of the hydrogen peroxide is much greater in the 8.5 to 11 pH range giving more time for the hydrogen peroxide to react. Using this model of the reactions it can be seen that in the simplest embodiment of the invention the solution is exposed to ultraviolet at a high pH; after sufficient irradiation the hydrogen peroxide is added and the reaction is allowed to go to completion at the lower pH in the absence of further radiation. However, in a more rapid embodiment the radiation continues after the initial addition of hydrogen peroxide and subsequently additional hydrogen peroxide is added, the pH is reduced, following which the reaction is allowed to take place in the absence of further radiation.

EXAMPLE 1

(A) A solution containing 1.800 grams $H_2O_2$ and 0.600 grams $K_3Fe(CN)_6$ in 1 liter was adjusted to pH 11. After 48 hours no change was observed in the total cyanide concentration.

(B) Three hundred fifty milliters of a solution containing 280 mg/l of cyanide in an iron cyanide complex at pH 12.4 was irradiated for 20 minutes during which time the temperature increased from 25° C. to 45° C. The solution became viscous and developed a brown color. The total cyanide concentration was unchanged; however, 29 percent of the cyanide was present as free cyanide ion. The irradiation was by ultraviolet from a high-pressure 450 watt mercury vapor lamp. After a warm-up period of 4 minutes, the lamp emits 58 watts of actinic radiation in the 200 nm to 335 nm wavelength range where the ferricyanide absorbs strongly. This is equivalent to 3.5 kJ of energy per minute ignoring the warm-up period in which the power increases from 0 to 3.5 kJ per minute. In this and subsequent examples, the effect of cell geometry is also ignored.

(C) The effects of variations of hydrogen peroxide and of actinic radiation were observed by determining the free and complex cyanide remaining at a pH of 11.5 in solutions originally containing 380 mg/l ferricyanide ion (or 280 mg/l as cyanide ion). The hydrogen peroxide, when present, was added at the beginning of the run. The initial data and results are presented as Table I. Run 4 is particularly significant in that it demonstrates that the greatest decrease in total cyanide occurs when relatively low concentrations of hydrogen peroxide are present in the solution.

EXAMPLE 2

(A) A solution containing 268 mg/l cyanide ion as ferricyanide was adjusted to pH 12 with caustic soda and irradiated with 53 kJ actinic radiation. After the initial irradiation, 1.1 grams of hydrogen peroxide were added per gram of ferricyanide and the solution was irradiated with an additional 35 kJ radiation. The pH was then adjusted to 8.5, additional hydrogen peroxide was added for a total of 4 grams hydrogen peroxide per gram of potassium ferricyanide, and the solution was allowed to stand. No free cyanide could be found after 24 hours and the complexed cyanide dropped to 10 mg/l. Repetition of the process reduced the complexed cyanide level to 0.1 mg/l.

(B) Example 2(A) was repeated with the exception that the initial pH was varied between 9.4 and 11.6 and was not subsequently reduced. The data and results are presented in Table II. This example shows that free cyanide ion is more completely destroyed at a lower pH than is required for optimum destruction of the iron cyanide complex.

EXAMPLE 3

A solution containing 363 mg/l ferricyanide ion was adjusted to pH 12.1. The solution was irradiated with 53 kJ actinic radiation. Hydrogen peroxide was then added at the rate of 1.1 gram per gram of ferricyanide ion and the solution was irradiated with an additional 35 kJ. At this time, the solution contained 90 mg/l cyanide, all of which was free cyanide, and had a pH of about 11.5; the hydrogen peroxide concentration had fallen from 400 mg/l to 0.5 mg/l. The solution was divided into three equal portions. Portion "A" was left in the dark without further treatment; hydrogen peroxide was added to portions "B" and "C" to bring the total hydrogen peroxide addition to 4 grams per gram of ferricyanide. The pH of portion "C" was adjusted to 8.5. The results are presented as Table III. This example shows that reducing the pH to less than 11 following irradiation results in optimum destruction of free cyanide. The example also indicates that in the absence of actinic radiation some recombination of iron and cyanide occurs to form an iron cyanide complex.

TABLE I

Effect of UV Radiation and Hydrogen Peroxide on Ferricyanide Ions

| Run | UV Exposure kJ | Peroxide Ratio* | % Cyanide Remaining | | |
|---|---|---|---|---|---|
| | | | Complexed | Free | Total |
| 1 | 35.0 | 4.7 | 69.7 | 19.6 | 89.3 |
| 2 | 87.5 | 4.7 | 14.5 | 50.0 | 64.5 |
| 3 | 35.0 | 2.3 | 85.7 | 3.6 | 89.3 |
| 4 | 87.5 | 2.3 | 23.2 | 7.1 | 30.3 |
| 5 | 35.0 | 9.3 | 67.8 | 21.4 | 89.2 |
| 6 | 87.5 | 9.3 | 7.2 | 53.6 | 60.8 |
| 7 | 105.0 | 0.0 | 67.8 | 30.4 | 98.2 |

*Peroxide ratio = grams of hydrogen peroxide per gram of ferricyanide ion.

TABLE II

Effect of pH on Complexed and Free Cyanide Destruction by UV and Hydrogen Peroxide

| pH | % Cyanide Ion Remaining | | |
|---|---|---|---|
| | Complexed | Free | Total |
| 9.40 | 23 | 6 | 29 |
| 10.68 | 35 | 5 | 40 |
| 11.20 | 16 | 18 | 34 |
| 11.60 | 5 | 57 | 62 |

TABLE III

Effect of Adjusting pH After Irradiation

| Run | pH | Peroxide Ratio* | % Cyanide Remaining | |
|---|---|---|---|---|
| | | | Free | Total |
| A | 11.5 | 1 | 30 | 30 |
| B | 11.0 | 4 | 7 | 11 |
| C | 8.5 | 4 | 0 | 4 |

*Peroxide ratio = grams of hydrogen peroxide per gram of ferricyanide ion

What is claimed is:

1. A process for destroying cyanide in an aqueous solution of an iron cyanide complex consisting essentially of:
   (a) adjusting the pH of the aqueous solution above 11,
   (b) irradiating the solution from step (a) absent hydrogen peroxide with at least 35 kilojoules of 200 to 335 nanometer actinic radiation to destroy said iron cyanide complex and form free cyanide ions, (c) adding to the solution from step (b) at least 1 gram of hydrogen peroxide per gram of the iron cyanide complex initially contained in the solution, (d) reducing the pH of the solution from step (c) between 8 and 11, and (e) reacting the solution from step (d) absent added 200 to 335 nanometer actinic radiation until substantially all of the free cyanide ion is destroyed.

2. The process of claim 1 wherein at least 2 grams of hydrogen peroxide are added in step (c) per gram of iron cyanide.

3. The process of claim 1 wherein at least 4 grams of hydrogen peroxide are added in step (c) per gram of iron cyanide.

4. A process for destroying cyanide in an aqueous solution of an iron cyanide complex consisting essentially of:

(a) adjusting the pH of the aqueous solution above 11, (b) irradiating the solution from step (a) absent hydrogen peroxide with at least 35 kilojoules 200 to 335 nanometer actinic radiation to destroy said iron cyanide complex and form free cyanide ions, (c) adding to the solution from step (b) at least 1.1 grams of hydrogen peroxide per gram of iron cyanide complex in the aqueous solution, (d) irradiating the solution from step (c) with at least 35 kilojoules 200 to 335 nanometer actinic radiation, (e) adding to the solution from step (d) at least 1 gram of hydrogen peroxide per gram of the iron cyanide complex initially contained in the solution.

(f) reducing the pH of the solution from step (e) between pH 8 and pH 11, and (g) allowing the solution from step (f) to react absent added 200 to 335 nanometer actinic radiation until substantially all of the free cyanide ion is destroyed.

5. The process of claim 4 wherein at least 2 grams of hydrogen peroxide are added in step (e) per gram of iron cyanide.

6. The process of claim 4 wherein at least 4 grams of hydrogen peroxide are added in step (e) per gram of iron cyanide.

* * * * *

UNITED STATES PATENT AND TRADEMARK OFFICE
CERTIFICATE OF CORRECTION

PATENT NO. : 4,446,029

DATED : May 1, 1984

INVENTOR(S) : Benedicte Betermier et al.

It is certified that error appears in the above-identified patent and that said Letters Patent is hereby corrected as shown below:

Column 5, line 20, "kilojoules" should read -- kilojoules of --.

Signed and Sealed this

Fourth Day of June 1985

[SEAL]

Attest:

DONALD J. QUIGG

Attesting Officer    Acting Commissioner of Patents and Trademarks